July 2, 1940.    R. I. MARKEY    2,206,414
JOINT FOR EXHAUST PIPES
Filed Sept. 27, 1939

INVENTOR.
Roscoe I. Markey
BY
ATTORNEY.

Patented July 2, 1940

2,206,414

UNITED STATES PATENT OFFICE 2,206,414

JOINT FOR EXHAUST PIPES

Roscoe I. Markey, East Orange, N. J., assignor to Pollak Manufacturing Company, Arlington, N. J., a corporation of New Jersey Application September 27, 1939, Serial No. 296,800

3 Claims. (Cl. 285—94)

The invention relates to joints for exhaust pipes.

It is a well known fact that internal combustion engines develop excessive heat when operating, particularly air cooled engines used for aircraft. A substantial amount of this heat enters the exhaust pipes causing them to expand and contract materially as the engine heats up and cools down. Where the exhaust pipes are rigidly secured to the exhaust outlets of the cylinders a great deal of trouble has been experienced with breaking and cracking due to the strains set up by heat expansion and contraction.

The principal object of the invention is to provide a joint for an exhaust pipe which, while it remains tight will permit of a slight axial and angular movement of the pipe thus relieving all strains due to heat expansion and contraction and eliminate the troublesome breaking and cracking of the exhaust pipes. The angular movement also compensates for slight inaccuracies in the parts and saves many annoying delays in assembling.

A preferred form of the invention will be described in the following specification and illustrated in the drawing forming a part thereof in which.

Figure 1:
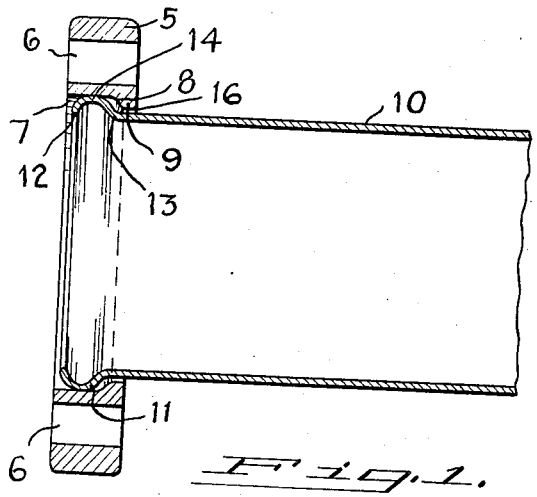
Fig. 1 is a view partly in elevation and partly in section.

Referring again to said drawing the reference numeral 5 designates a flange which may be provided with openings 6 for the reception of bolts to secure the flange to the engine cylinder. The flange has a deep annular recess 7 the bottom of which is curved inwardly at 8 to form an annular retaining lip 9.

Figure 3:
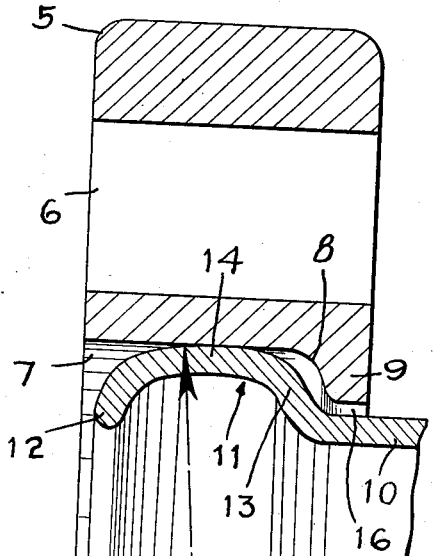
Fig. 3 is a detail sectional view taken on a larger scale.
Figure 2:
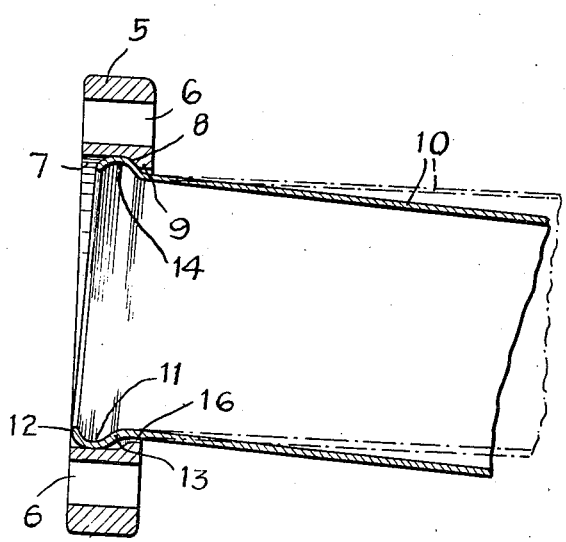
Fig. 2 is a similar view illustrating the angular movement of the pipe.

The exhaust pipe 10 has a circumferential bead 11 on its inner end to cooperate with the recess 7, the external diameter of the bead being equal to the internal diameter of the recess in the flange. This bead is formed of two curved portions 12 and 13 connected by an intermediate curved portion 14. The two curved portions 12 and 13 are of a comparatively short radius such for instance as substantially on the order of the heighth of the bead. The connecting portion 14 is made with a comparatively long radius, such for instance as on the order of the diameter of the pipe, 10 plus the heighth of the bead. This radius is indicated by broken lines at 15 in Fig. 3.

The depth of the recess 7 is greater than what might be termed the length of the bead thus permitting of axial movement of the exhaust pipe. A clearance 16 is provided between the lip 9 and the pipe 10 so as to allow for the angular movement of the exhaust pipe. The center 5 from which the radius of the connecting portion of the bead is struck being on the center line of the exhaust pipe a ball and socket effect is obtained and the angular movement of the exhaust pipe is permitted while a tight joint is maintained to prevent the escape of gases.

I claim:

1. A joint for an exhaust pipe, said joint comprising a flange, a deep annular recess formed in said flange, a retaining lip for said recess, and a circumferential bead formed on the end of the exhaust pipe, said bead having an external diameter equal to the internal diameter of said recess, said recess being of sufficient depth to allow the bead to move longitudinally therein and permit of axial movement of said exhaust pipe and said retaining lip having sufficient clearance between it and the exhaust pipe to permit of angular movement of said exhaust pipe.

2. A joint for an exhaust pipe, said joint comprising a flange, a deep annular recess terminating in a retaining lip formed in said flange, and a circumferential bead formed on the end of the exhaust pipe, said bead having an external diameter equal to the internal diameter of said recess, said recess being of sufficient depth to allow the bead to move longitudinally therein and permit of axial movement of said exhaust pipe and said retaining lip having sufficient clearance between it and the exhaust pipe to permit of angular movement of said exhaust pipe.

3. A joint for an exhaust pipe, said joint comprising a flange, a deep annular recess terminating in a retaining lip formed in said flange, and a circumferential bead formed on the end of the exhaust pipe, said bead having an external diameter equal to the internal diameter of said recess and being formed of two curved portions connected by an intermediate curved portion, the radius of the two curved portions being on the order of heighth of the bead and the radius of the intermediate curved portion being in the order of the diameter of the exhaust pipe plus the heighth of the bead, the length of the bead being less than the depth of the recess so as to permit of axial movement of the exhaust pipe, and a clearance between the retaining lip and the exhaust pipe to permit angular movement of the exhaust pipe.

ROSCOE I. MARKEY.